Nov. 24, 1942.   J. GORDON   2,302,853
SPEED CHANGE GEAR UNIT
Filed April 9, 1940
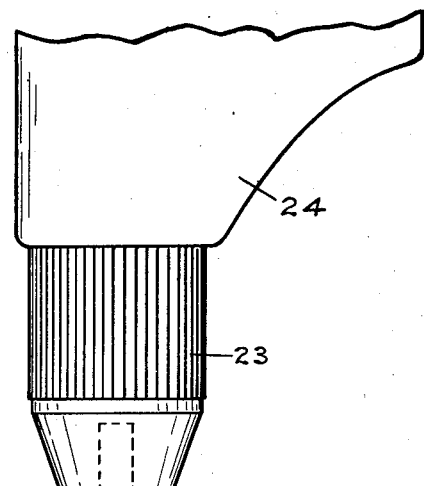
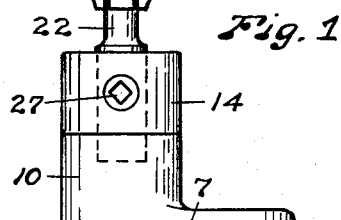
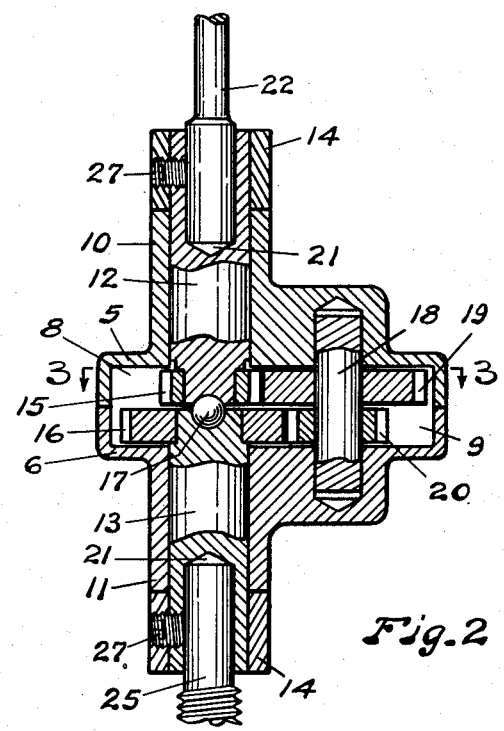
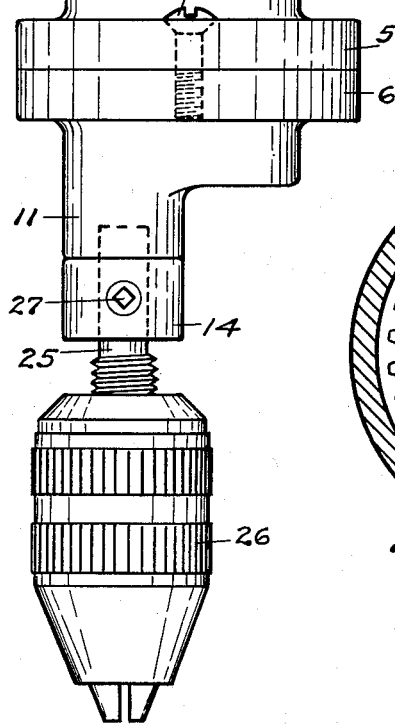
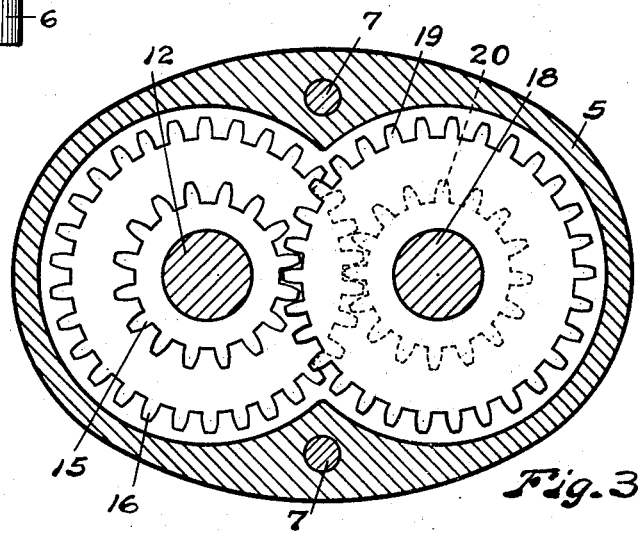
Fig. 1
Fig. 2
Fig. 3
INVENTOR.
John Gordon
BY Fred G. Matheny
ATTORNEY.

Patented Nov. 24, 1942

2,302,853

UNITED STATES PATENT OFFICE 2,302,853

SPEED CHANGE GEAR UNIT

John Gordon, Seattle, Wash., assignor of one-half to Joseph S. Davis, Seattle, Wash.

Application April 9, 1940, Serial No. 328,618

2 Claims. (Cl. 74—421)

This invention relates to a change speed gear unit adapted to be operatively connected between a driven member and a member to be driven to provide a change of speed ratio between said two members.

An object of this invention is to provide a small portable change speed gear unit for use with a small portable constant speed electric driving unit, which gear unit greatly increases the utility of the driving unit and broadens the scope of the work for which said driving unit may be successfully used.

Another object of this invention is to provide a change speed gear unit that is quickly and easily reversible whereby it may be used either as a speed reduction gear or as a speed increase or step up gear.

Another object of this invention is to provide a change speed gear unit comprising two power transmitting shafts disposed in end to end relation in alignment with each other and having a thrust bearing between the adjacent ends of said two shafts providing for efficient operation of said two shafts at different speeds, under thrust or longitudinal compression and with a minimum amount of friction, said thrust bearing also acting as a coupling between the two shafts to maintain alignment of the shafts and reduce wear on the radial bearings.

Another object of this invention is to provide a speed change gear unit that is especially well adapted for use in connection with portable electrically driven tools, such as electric drills, to establish either a reduced or an increased rotary speed ratio between the driving mechanism and the cutting mechanism of such tools and adapt them for work they are not suited to perform at their normal speeds.

Another object of this invention is to provide a change speed gear unit of this nature that is strong, simple and compact in construction, efficient in operation, convenient to use and very durable.

As an instance of one advantageous use to which this speed change gear unit may be put the same may be employed as a speed reduction gear in connection with a standard portable one fourth inch electric drill and when so used it will reduce the rotary speed and increase the torque of said one fourth inch drill sufficiently so that the same may be satisfactorily used for drilling holes up to one half inch, or for operating a reamer where slower speeds are desired, or for operating a circular sheet metal saw up to one and one half inch diameter.

Other objects of this invention will be apparent from the following description and appended claims.

In the drawing

Fig. 1 is an elevation of a change speed gear unit constructed in accordance with this invention showing the gear unit connected with an electric drill and showing a chuck connected with the gear unit, parts of the electric drill being broken away.

Fig. 2 is a longitudinal sectional view with parts in elevation of this change speed gear unit.

Fig. 3 is an enlarged sectional view, with parts in plan, taken substantially on broken line 3—3 of Fig. 2.

Like reference numerals designate like parts throughout the several views.

This change speed gear unit comprises a housing formed of two parts 5 and 6 of duplicate construction adapted to be secured together by screws 7 and provided respectively with gear receiving cavities 8 and 9 that cooperate to form a gear housing when the two parts 5 and 6 are assembled. The two housing parts 5 and 6 are provided with tubular bearing bosses 10 and 11 respectively, that are axially aligned with each other when the housing parts 5 and 6 are assembled.

Two power transmitting shafts 12 and 13 are journaled in the respective bearing bosses 10 and 11 and project beyond the outer end portion of said bearing bosses and preferably have sleeves or collars 14 fitted thereon.

The inner ends of the shafts 12 and 13 have gearwheels 15 and 16 respectively fixed secured thereon. The gearwheels 15 and 16 are of different size, the gearwheel 15 being smaller than the gearwheel 16.

A thrust bearing, preferably in the form of a steel ball 17 is provided between the adjacent ends of the two power transmitting shafts 12 and 13 to efficiently withstand thrust on these shafts while said shafts are rotating at different speeds. The ball 17 is embedded partly in each shaft 12 and 13 so that it holds these two shafts in axial alignment and in so doing helps to reduce radial wear on the shafts and bearing bosses.

A countershaft 18 is journaled in suitable bearings in the housing parallel to the shafts 12 and 13 and to one side of said shafts 12 and 13. Two gearwheels 19 and 20 are fixedly secured to the countershaft 18 and operatively meshed with the gearwheels 15 and 16 respectively. The gearwheel 19 is larger than the gearwheel 20. The large gearwheel 19 on the countershaft 18 meshes with the small gearwheel 15 on the power transmitting shaft 12. The small gearwheel 20 on the countershaft 18 meshes with the large gearwheel 16 on the power transmitting shaft 13. This provides an efficient speed change gear that occupies a small amount of space, leaves the two power transmitting shafts in axial alignment and permits the use of an oval shaped housing that is off center, as respects shafts 12 and 13 just enough to provide a good hand hold by which the tool may be held and guided and torque efficiently resisted.

I have shown each of the two small gearwheels as provided with sixteen teeth and each of the two large gearwheels as provided with thirty teeth. This provides a gear ratio especially well adapted as a speed reduction gear for adapting a standard one fourth inch portable electric drill for use as a one half inch drill, thus enabling a mechanic who has a one quarter inch drill to also do work that ordinarily requires a one half inch drill and reducing by one half the number of electric drills he is required to have available. Obviously this speed reduction gear may be built to different speed ratios to suit different requirements.

By constructing the housing parts of a good grade of bronze and the several shafts of steel I am able to provide a unit that operates smoothly and efficiently and with low friction and that has excellent wearing qualities and ample strength.

The outer end portions of the shafts 12 and 13 have inwardly extending axial bores 21 of equal diameter for establishing connections between said shafts and other shafts. Figs. 1 and 2 show an adapter shaft 22 connecting the power transmitting shaft 12 with the chuck 23 of an electric drill 24 and another adapter shaft 25 connecting the power transmitting shaft 13 with a chuck 26 that is adapted to receive and hold any suitable cutting tool.

A screw 27 is provided in connection with each shaft 12 and 13 and the collar 14 thereon for securely locking and holding the adapter shaft in place. Preferably the collars 14 are closely fitted on the shafts 12 and 13 and provide sufficient thickness of metal to receive a screw 26 long enough to efficiently hold an adapter shaft.

The housing members 5 and 6 are of duplicate construction and may all be cast in the same mold and finished in the same way thus making for low cost construction.

The means provided for connecting the power transmitting shafts 12 and 13 with the adapter shafts 22 and 25 is the same in both shafts thus making the gear unit reversible to be used for speed reduction or speed increase.

The operation of this device is believed to be clear from the foregoing description. When used with an electric power unit that operates most efficiently at a predetermined constant speed, this speed change unit will adapt said electric power unit for uses that the electric power unit is not capable of successfully performing without the change speed device. It thus reduces the number of electric power units that are required for certain classes of work and increases the capacity or scope of the power units with which it is used.

The foregoing description and accompanying drawing clearly disclose a perferred embodiment of my invention but it will be understood that this disclosure is merely illustrative and that changes may be made in the invention within the scope and spirit of the following claims.

I claim:

1. A speed change gear unit for use with an electric drill to provide a change in rotary speed between the electric drill and a tool to be driven thereby, comprising a multiple part housing having two axially aligned tubular bearing bosses; two aligned power transmitting shafts rotatably mounted one in each bearing boss and extending outwardly from said bearing bosses and having sockets in their outer end portions for releasable connection either with the electric drill or the tool; a collar on the outer end portion of each power transmitting shaft; a set screw threaded through each collar and shaft adapted to releasably secure a member within the socket in the shaft, said speed change gear unit being reversible end for end as respects said electric drill and said tool; a large gearwheel and a small gearwheel positioned in said housing and fixedly mounted on the respective power transmitting shafts; a countershaft journaled in said housing; and a large gearwheel and a small gearwheel both mounted on and secured to said countershaft, the large gearwheel on said countershaft meshing with the small gearwheel on one power transmitting shaft and the small gearwheel on the countershaft meshing with the large gearwheel on the other power transmitting shaft.

2. A speed change gear unit for use with an electric drill power unit to provide a change in rotary speed between the electric drill power unit and a chuck to be driven thereby, comprising a housing formed of two parts each having a tubular bearing boss, said two bearing bosses being aligned with each other when the housing parts are assembled; two aligned power transmitting shafts rotatably mounted one in each bearing boss; two sockets of the same size in the outer end portions of the respective shafts; a ball operatively disposed between adjacent ends of said two power transmitting shafts to provide a thrust bearing and align said shafts; a large gearwheel and a small gearwheel positioned in said housing and fixedly mounted on the respective power transmitting shafts; a countershaft journaled in said housing; a large gearwheel and a small gearwheel both mounted on and secured to said countershaft, the large gearwheel on said countershaft meshing with the small gearwheel on one power transmitting shaft and the small gearwheel on the countershaft meshing with the large gearwheel on the other power transmitting shaft; and two spindles adapted to interchangeably fit said sockets for selectively connecting either the electric drill power unit or the chuck with either of said power transmitting shafts whereby the gear unit may be reversed end for end relative to the electric drill power unit and the chuck to selectively provide either a speed reduction or a speed increase gear.

JOHN GORDON.